United States Patent
Tijssen

[11] Patent Number: 6,037,401
[45] Date of Patent: Mar. 14, 2000

[54] FLAME RETARDANT POLYAMIDE COMPOSITION

[75] Inventor: Johannes Tijssen, Beek, Netherlands

[73] Assignee: DSM N.V., Heerlen, Netherlands

[21] Appl. No.: 09/140,646

[22] Filed: Aug. 26, 1998

Related U.S. Application Data

[63] Continuation of application No. PCT/NL97/00075, Feb. 19, 1997.

[30] Foreign Application Priority Data

Feb. 26, 1997 [BE] Belgium ................................ 9600163

[51] Int. Cl.$^7$ .............................. C08L 77/00; C08L 25/06
[52] U.S. Cl. .......................... 524/514; 525/178; 525/184
[58] Field of Search ..................................... 525/178, 184; 524/409, 410, 411, 412, 433, 436, 437, 467, 468, 469, 494, 606, 514

[56] References Cited

U.S. PATENT DOCUMENTS

| | | | |
|---|---|---|---|
| 4,137,212 | 1/1979 | Theysohn et al. | 525/178 |
| 4,360,616 | 11/1982 | Pagilagan | 524/467 |
| 4,373,043 | 2/1983 | Richardson | 524/606 |
| 4,456,723 | 6/1984 | Breitenfellner et al. | 524/415 |
| 4,525,513 | 6/1985 | Hochberg et al. | 524/606 |
| 4,666,965 | 5/1987 | Aoki | 524/412 |
| 4,696,966 | 9/1987 | Williams | 524/412 |
| 4,755,573 | 7/1988 | Aycock | 526/209 |
| 4,788,244 | 11/1988 | Nakahashi et al. | 524/469 |
| 4,857,576 | 8/1989 | Kochi et al. | 525/184 |
| 5,157,064 | 10/1992 | Gijsman | 524/469 |
| 5,191,020 | 3/1993 | Masamoto et al. | 525/123 |
| 5,256,718 | 10/1993 | Yamamoto et al. | 524/469 |
| 5,258,439 | 11/1993 | Togashi et al. | 524/430 |
| 5,369,202 | 11/1994 | Atwell et al. | 526/293 |
| 5,442,042 | 8/1995 | Zeiner et al. | 528/502 |
| 5,543,452 | 8/1996 | Nakahashi et al. | 524/410 |
| 5,565,538 | 10/1996 | Zingde et al. | 526/273 |
| 5,674,952 | 10/1997 | Onishi et al. | 525/432 |
| 5,846,478 | 12/1998 | Onishi et al. | 525/183 |

FOREIGN PATENT DOCUMENTS 0 448 221 A1  9/1991  European Pat. Off. .
WO 95/18178  7/1995  WIPO .

*Primary Examiner*—Peter A. Szekely
*Attorney, Agent, or Firm*—Pillsbury Madison & Sutro Intellectual Property Group

[57] ABSTRACT

The invention relates to a flame retardant polyamide composition comprising at least one polyamide and a polymerized bromostyrene. In particular, the invention relates to polyamide compositions comprising a polymerized bromostyrene with a bromine content of more than 61% (wt).

9 Claims, No Drawings

FLAME RETARDANT POLYAMIDE COMPOSITION

This is a continuation of: International Application No. PCT/NL97/00075 filed Feb. 19, 1997 which designated the U.S.

The invention relates to a flame retardant high-melting polyamide composition comprising at least one polyamide and a bromine-containing styrene polymer of a high molecular weight. Such a composition is known from various patent publications. For instance, WO-A-9518178 discloses a composition comprising:
a. at least one polyamide
b. glass fibre reinforcement
c. a bromine-containing polystyrene and
d. magnesium hydroxide or magnesium oxide.

The disadvantage of bromine-containing flame retardants generally is that, after their incorporation in electronic and electric parts, they may give rise to so-called copper corrosion. This particularly occurs when, due to the high melting point of the polyamide, the composition must be processed at high temperatures, for instance 300° C. and higher. In that case the processing equipment, too, will be affected by, inter alia, so-called mould staining.

Another disadvantage is the frequently serious discolouration of the composition.

For remedial purposes it is recommended in WO-A-91/13915 and elsewhere to very carefully wash the bromine-containing compound to remove inorganic bromine and chlorine. The brochure of the firm of Great Lakes Chemical Corporation for its product PDBS-80 (polydibromostyrene) indicates that said product does not lead to copper corrosion and, besides, causes only a slight discolouration.

An explanation for the substantially improved corrosion resistance of the poly(bromostyrene) compound, i.e. polymerized bromostyrene, over that of brominated polystyrene compounds may, according to U.S. Pat. No. 5,369,202, well be found in the absence of brominated side chains (what is meant is probably brominated aliphatic hydrocarbons), which show less thermal stability and may make it possible for inorganic bromine to be split off. Such 'brominated side chains' do develop in the customary polystyrene bromination processes.

However, the use of the polymerized dibromostyrene, which is marketed under the trade name PDBS® and which has a bromine content of about 58–60% (wt), has the disadvantage that the mechanical properties, particularly the toughness, of the glass fibre reinforced polyamide compositions in which it is incorporated are inferior to those of, for instance, compositions with the same flame retardancy in which brominated polystyrene has been used as flame retarding agent.

For use in electronics in particular, for instance plug connections, in which a temporary deformation occurs, this constitutes a serious disadvantage, which also manifests itself when the pins are inserted during the production process.

The object of the invention is a flame retardant polyamide composition that does not show the above-mentioned disadvantages.

Now the inventor has very surprisingly found that a substantial improvement of the mechanical properties is obtained, even to beyond the level of comparable compositions based on brominated polystyrene, when the bromine-containing styrene polymer is a polymer of brominated styrene containing at least more than 2 bromine atoms per styrene monomer, i.e. the bromine content of the polybromostyrene is more than 61% (wt), preferably at least 62% (wt), more preferably at least 63% (wt). A maximum limit for the bromine content is hard to be indicated and is in principle determined by the maximum number of Br atoms to be bound to a styrene monomer, which is 5–6. Preference, however, is given to a maximum bromine content of 70% (wt), more preferably 68% (wt), because otherwise the brown colouration of the polyamide composition may be too strong and bromination of the side chain may come to play a part.

The polybromostyrene content of the composition according to the invention may vary between wide limits and is in principle determined particularly by the desired flame retardancy level of the composition. Generally the content will be between 1 and 40% (wt), preferably 2 and 30% (wt) of the composition.

The flame retardant action of the composition can further be strengthened by the presence of a second component. For this purpose all substances that are known in the art to strengthen the action of halogen-containing flame retardants will in principle qualify. Examples of such substances are metal oxides, for instance antimony oxide and the oxides of alkaline earth metals, metal hydroxides, for instance magnesium hydroxide and aluminium hydroxide, phosphorus-containing compounds, etc. The content thereof may vary between wide limits, but generally does not exceed the polybromostyrene content.

The composition may further contain the usual additives, for instance glass fibre reinforcement, stabilizers, release agents, flow-promoting agents, colourants and pigments, inorganic fillers, for instance mica, chalk and clay and nucleating agents, for instance talcum, to the extent to which the properties are not adversely affected.

The additives content will generally not be in excess of 50% (wt).

If glass fibres are present in the composition, their content may vary within wide limits and is determined in part by the level of the mechanical properties that is intended to be reached. Generally, the glass fibre content will not be in excess of 50% (wt) calculated on the total composition.

The polybromostyrene for the composition according to the invention can be obtained, inter alia, using the process disclosed in U.S. Pat. No. 5,369,202. In that process, carried out in the absence of a solvent after a prepolymerization step in for instance a single screw extruder or in a static mixer at about 150° C. until at least 20% of the monomers has been polymerized, a mixture of brominated styrene monomers is further condensed in a subsequent reactor in the presence of a polymerization initiator, for instance benzoyl peroxide, at a higher temperature, for instance higher than 200° C. Very suitable for this purpose again is an extruder. The two polymerization steps can be carried out in one piece of equipment having different temperature zones.

The mixture of brominated styrene monomers generally contains mono-, di- and tribromostyrene. By varying the ratios in the composition the desired bromine content of the polybromostyrene for the composition according to the invention can be obtained. Generally the mixture will then substantially consist of di- and tribromostyrene.

For further details of the preparation of the polybromostyrene reference is made to U.S. Pat. No. 5,369,202.

The molecular weight of the polybromostyrene, expressed as weight average molecular weight, Mw, will generally be between 10,000 and 250,000. A molecular weight smaller than about 10,000 is apt to give rise to so-called bleed-out effects, which explains why preference is given to a molecular weight of at least 20,000, while a molecular weight in excess of 250,000 may cause problems in processing the styrene polymer.

In polyamide compositions having a processing temperature of, for instance, more than 300° C. preference is generally given to polybromostyrene having a high molecular weight; at lower processing temperatures, for instance 250° C., a lower molecular weight polybromostyrene is preferably chosen.

The thermal stabilizer used is preferably a compound from the group of sterically hindered phenol compounds, for instance 1,3,5-trimethyl-2,4,6-tris(3,5-di-6-butyl-4-hydroxybenzyl)benzene and N,N'-hexamethylene-bis(3,5-d-t-butyl-4-hydroxycinnamide) available under the trade name Irganox 1098 from the firm of Ciba Geigy.

In general the composition according to the invention will be within the following limits:
a. 20–99% (wt) polyamide
b. 1–40% (wt) polybromostyrene with a bromine content of more than 61% (wt)
c) 0–40% (wt) flame retardancy improving compound
d) 0–50% (wt) glass fibre reinforcement
e) 0–50% (wt) other additives $(a+b+c+d+e)=100\%$.

The invention is very effective for a composition in which the polyamide has a melting point higher than about 280° C. Examples of such high-melting polyamides are the aliphatic polyamide 4.6, polytetramethyleneadipamide, the semi-aromatic (co)polyamides containing units derived from at least one aromatic dicarboxylic acid, for instance tere- or isophtalic acid or naphthalene dicarboxylic acid, and an aliphatic or cycloaliphatic diamine and optionally an aliphatic dicarboxylic acid and an aliphatic or cycloaliphatic diamine and polyamides with units derived from an aliphatic diamine and a cycloaliphatic dicarboxylic acid.

Examples of such semi-aromatic copolyamides are polyamide 6.T, 6.6/6.I/6.T, 6/6.T, 6.6./6.T, 6.I/6.T/2MP.T or 6/6.6/6.T, in which T=terephthalic acid, I=isophthalic acid and 2 MP.T=2-methylpentamethylene terephthalic diamide. Such semi-aromatic (co)polyamides are commercially available under various trade names.

The invention is now further elucidated by means of the following examples and comparative experiments without, however, being limited thereto.

EXAMPLES

Examples I and II and Comparative Experiments A, B and C

The compositions of table I were prepared in a Werner and Pfleiderer ZSK-25 twin-screw extruder. The set values of the extruder were: 370 rpm, cylinder temperature 300° C., throughput 24 kg/h, melt temperature 335° C.

The various components were premixed in a tumble dryer and supplied via a hopper to the extruder. Glass fibre was side fed to the melt in the case of polyamide 4.6. The extrusion was carried out in a nitrogen atmosphere. The materials had been pre-dried at 105° C.

Of the dried compositions obtained, test bars, ISO 3167 A, thickness 4 mm for the mechanical testing and 0.8 mm for determining the flame retardancy according to UL-94, were injection moulded using a Battenfeld BA 350 injection moulding machine. Injection moulding conditions: melt temperature 315° C., mould temperature 120° C.

The flow length in a flat spiral having a diameter of 10.3×1.6 mm was determined using an ARBURG CMD 370 injection moulding machine with an injection pressure set at 800 bar (melt temperature 315° C., mould temperature 120° C.).

In table I the compositions are given, in which the polyamide 4.6 and the semi-aromatic polyamide just complied with the requirements of the V-O classification according to UL-94.

TABLE 1

|  |  | Comp. Exp. A | Comp. Exp. B | Example I | Comp. Exp. C | Example II |
|---|---|---|---|---|---|---|
| Polyamide 4.6[1] | wt. % | 42.75 | 39.75 | 41.25 |  |  |
| Aromatic copolyamide[2] |  |  |  |  | 40.05 | 41.05 |
| glassfibre | wt. % | 30.00 | 30.00 | 30.00 | 32.40 | 32.40 |
| Irganox 1098 | wt. % | 0.38 | 0.38 | 0.38 |  |  |
| brominated PS[3] | wt. % | 18.75 |  |  |  |  |
| polybromostyrene[4] Br < 60 wt. % | wt. % |  | 21.75 |  | 19.50 |  |
| polybromostyrene[5] (Br > 60 wt. %) | wt. % |  |  | 20.25 |  | 18.50 |
| antimoniumtrioxide masterbatch in PA.6 (80/20) | wt. % | 7.80 | 7.80 | 7.80 | 7.80 | 7.80 |
| mould release agent | wt. % | 0.32 | 0.32 | 0.32 | 0.32 | 0.32 |
| spiral flow length | mm | 190 | 219 | 204 | 190 | 202 |
| tensile strength[6] | NPa | 178 | 159 | 182 | 172 | 183 |
| elongation[6] | % | 2.19 | 2.09 | 2.45 | 1.5 | 1.95 |
| modulus | NPa | 11405 | 10971 | 10965 | 11670 | 11705 |

[1]STANYL KS 200 ® DSM, The Netherlands
[2]ZYTEL HTN ® 51G35 from Du Pont de Nemours, USA; a heat stabilized copolyamide with units based on 2-methylpentamethylene terephtalicdiamide and hexamethyleneterephtalicdiamine
[3]Pyrocheck 68 PB ® Ferro, USA; brominated polystyrene, Br-content 68 wt. %
[4]PDBS 80 ® of Great Lakes; polymerised bromostyrene, Br-content 58 wt. %
[5]Br-content 63 wt. %, Mw = 38.000, rest monomercontent < 0.8 wt. %
[6]ISO-527 (5 mm/min.)

Mold staining has been determined visually by controlling the mould used for injection moulding the ISO 3167 A test specimen necessary for the tensile tests after 50 shots.

The mould showed significant staining in comparative experiment A. In the Examples I and II staining could hardly or not be observed It should be further noted that the compositions based on polyamide 4.6 show a much better elongation at break than the composition with the semi-aromatic polyamides.

I claim:

1. A flame retardant polyamide composition comprising
   a. at least one polyamide, and
   b. polymerized bromostyrene
      wherein the polymerized bromostyrene has a bromine content of more than 61% (wt), and a weight average molecular weight between 10,000 and 250,000.

2. The flame retardant polyamide composition according to claim 1, wherein the bromine content of the polymerized bromostyrene is at least 62% (wt).

3. The flame retardant polyamide composition according to claim 2, wherein the bromine content of the polymerized bromostyrene is at least 63% (wt).

4. The flame retardant polyamide composition according to claims 1, 2, or 3 wherein the composition also contains a compound strengthening the flame retarding action.

5. The flame retardant polyamide composition according to claims 1, 2, or 3 wherein the composition also contains glass fibre reinforcement.

6. The flame retardant polyamide composition according to claims 1, 2, or 3 wherein the polyamide has a melting point higher than 280° C.

7. A flame retardant polyamide composition comprising, relative to the total weight of the composition:
   a) 20–99% (wt) polyamide; and
   b) 1–40% (wt) polymerized bromostyrene having a bromine content higher than 61% (wt) and a weight average molecular weight between 10,000 and 250,000
   c) 0–40% (wt) of a compound strengthening the flame retarding action
   d) 0–50% (wt) glass fibre reinforcement
   e) 0–50% (wt) other additives
   in which (a+b+c+d+e)=100%.

8. An electronic or electric part comprising a flame retardant polyamide composition comprising at least one polyamide and polymerized bromostyrene, wherein the polymerized bromostyrene has a bromine content of more than 61% (wt) and a weight average molecular weight between 10,000 and 250,000.

9. The composition of claim 1, wherein the polymerized bromostyrene has a weight average molecular weight of at least 20,000.

* * * * *